Patented Aug. 6, 1929.

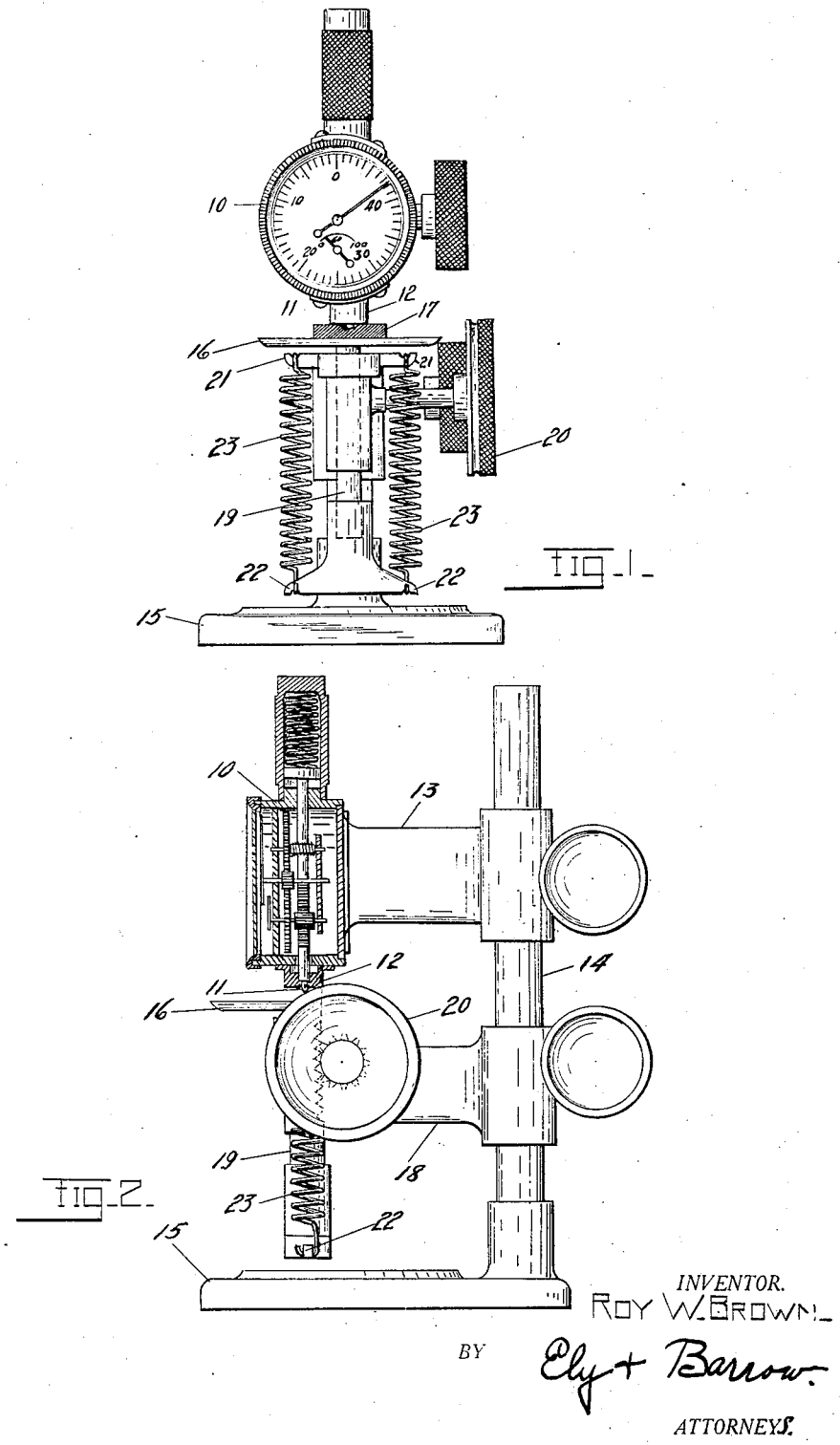

1,723,404

UNITED STATES PATENT OFFICE.

ROY W. BROWN, OF AKRON, OHIO, ASSIGNOR TO THE FIRESTONE TIRE AND RUBBER COMPANY, OF AKRON, OHIO, A CORPORATION OF OHIO.

EXTENSOMETER MOUNTING.

Application filed June 24, 1927. Serial No. 201,257.

This invention relates to a mounting for an extensometer or device for measuring the hardness of rubber or like substances.

An object of the invention is to devise a mounting for an extensometer or penetrometer for rapidly and accurately measuring the compressibility of rubber or like materials, said mounting so supporting the extensometer and the material to be gaged to maintain a constant pressure on the latter during successive gaging operations.

The foregoing and other objects are obtained by the construction illustrated in the enclosed drawings and described below, it being understood that the invention is not limited to the specific form and arrangement thereof disclosed herein.

Of the accompanying drawings:

Figure 1 is a front elevation of a device embodying the principles of the invention; and Figure 2 is a vertical section thereof.

The extensometer 10 comprised in the device is of a known type, similar to that disclosed in the patent to Zimmerman and Williams, No. 1,519,602, granted December 16, 1924. This instrument measures the compressibility of hardness of rubber or like materials by gaging the amount of penetration obtained by a spring-pressed pin 11 projecting from a foot or base 12 when the latter engages flatly against or tangent to the surface of the material to be tested. The instrument 10 is supported on a bracket 13 clamped to a standard 14 having a base 15, while a loading table 16 for holding the body 17 of material to be tested is supported on a similar bracket 18 clamped to the standard. Table 16 is provided with a stem 19 slidable through bracket 18; the table being raised and lowered through a rack and pinion engagement by turning wheel 20. It has been found that varying of the pressure of the foot or base 12 against the material to be tested will cause variations in the result indicated by the instrument. In order to obtain a uniform pressure on the material to insure uniform and accurate reading, a pair of arms 21, 21 are mounted on bracket 18, a similar pair of arms 22, 22 mounted on the lower end of stem 19, and a pair of coil springs 23, 23 stretched between the respective pairs of arms. It will be seen that, with a given setting of brackets 13 and 18 and a constant thickness of material 17, a constant definite pressure of foot 12 against the material will be maintained. Thus, a number of bodies 17 may be tested in succession with precision and speed by lowering the table for the insertion of the body and permitting the springs to raise the table with the required uniform pressure. For testing irregular shaped or curved objects, suitable holders (not shown) may be secured to the table to insure a tangential contact of the object against the center of foot 12.

Modifications of the structure herein disclosed may be resorted to without departing from the spirit of the invention or the scope thereof as defined by the appended claims.

What is claimed is:

1. Testing apparatus of the class described, comprising an instrument having a foot for engaging the body of material to be tested, a spring-pressed pin in said foot for penetrating said body, said instrument including means for indicating the degree of penetration of said pin, a loading table for carrying said body, a support for said table, resilient means between said support and table to force the latter toward said instrument for obtaining a uniform degree of pressure of said body against said foot, and means for mounting said instrument and said support in relatively fixed relation.

2. In an apparatus of the class described, an extensometer and a mounting therefor including a table for holding the body of material to be tested, brackets for supporting the extensometer and the table in spaced relation and a spring connected to the table and its bracket for resiliently forcing the table toward the extensometer with a uniform pressure.

3. In an apparatus of the class described, an extensometer and means for presenting bodies of material to be tested into operative position with respect to said extensometer and for forcing said bodies into operative engagement with said extensometer successively with a uniform pressure.

ROY W. BROWN.